United States Patent [19]

Beimgraben

[11] Patent Number: 4,476,944
[45] Date of Patent: Oct. 16, 1984

[54] METHOD OF PROVIDING A FLUID SEAL IN DOWNHOLE DRILLING APPARATUS

[75] Inventor: Herbert W. Beimgraben, Houston, Tex.

[73] Assignee: Baker International Corporation, Orange, Calif.

[21] Appl. No.: 245,771

[22] Filed: Mar. 20, 1981

Related U.S. Application Data

[62] Division of Ser. No. 023,420, Mar. 23, 1979.

[51] Int. Cl.³ .............................................. E21B 4/02
[52] U.S. Cl. ..................................... 175/65; 175/107
[58] Field of Search ..................... 175/107, 101, 65, 92

[56] References Cited

U.S. PATENT DOCUMENTS

| | | | |
|---|---|---|---|
| 3,722,608 | 3/1973 | Faulk | 175/107 |
| 3,741,321 | 6/1973 | Slover, Jr. et al. | 175/107 |
| 3,866,988 | 2/1975 | Striegler | 175/92 |
| 4,114,702 | 9/1978 | Maurer et al. | 175/107 |

FOREIGN PATENT DOCUMENTS

1923282  3/1969  Fed. Rep. of Germany ...... 175/107

*Primary Examiner*—Stephen J. Novosad
*Assistant Examiner*—William P. Neuder
*Attorney, Agent, or Firm*—Norvell & Associates

[57] ABSTRACT

A method of drilling a subterranean well utilizing a downhole drilling apparatus is disclosed. The apparatus has a driven rotary drive shaft and a relatively fixed tubular housing circumjacent the drive shaft, with the housing having an annular upwardly facing bearing surface at an angle to a longitudinal axis of the housing and an annular sealing surface facing downwardly at an angle to the axis and axially spaced above the upwardly facing bearing surface. The method includes the steps of securing the drilling apparatus to the lower end of a string of drill pipes suspended in the well with the longitudinal axis of the housing coincident with the longitudinal axis of the string of drill pipe. Thereafter, the drill bit is secured to the lower end of the drive shaft, and fluid is pumped through the drilling apparatus to rotate the drive shaft and the bit. A rotating bearing and sealing device is positioned and secured relative to the drive shaft remotely within the well and axially between the spaced-apart annular bearing surface and annular sealing surface, with the rotating bearing and sealing device having a lower annular surface bearing upon and in face-to-face contact with the upwardly facing bearing surface and having an upper annular surface biased upwardly against the annular sealing surface in face-to-face contact therewith, whereby the axially spaced-apart pairs of annular surfaces provided a seal between the shaft area within the downhole apparatus and that area radially external of said bearing and sealing surface.

2 Claims, 3 Drawing Figures

METHOD OF PROVIDING A FLUID SEAL IN DOWNHOLE DRILLING APPARATUS

CROSS-REFERENCE TO RELATED APPLICATIONS

This application is a division application of Ser. No. 023,420 filed Mar. 23, 1979 which in turn is related to the subject matter in the following co-pending applications, each assigned to the same assignee as this application: co-pending application Ser. No. 023,202 filed Mar. 23, 1979 entitled "Fluid Pressure Actuated By-Pass and Release Valve"; co-pending application Ser. No. 023,200 filed Mar. 23, 1979 entitled "Apparatus and Method for Closing a Failed Open Fluid Pressure Actuated Relief Valve"; co-pending application Ser. No. 023,199 filed Mar. 23, 1979 entitled "Universal Joint Apparatus for Separating Thrust and Torque Forces"; co-pending application Ser. No. 023,423 filed Mar. 23, 1979 entitled "Universal Joint Apparatus having Sliding Plate Construction for Separating Thrust and Torque Forces"; co-pending application Ser. No. 023,422 filed Mar. 23, 1979 entitled "Improvements in Fluid Sealing of a Universal Joint for a Downhole Drilling Apparatus"; co-pending application Ser. No. 023,421 filed Mar. 23, 1979 entitled "Marine Bearing for a Downhole Drilling Apparatus"; and copending application Ser. No. 023,419 filed Mar. 23, 1979 entitled "Apparatus for Applying Pressure to Fluid Seals".

BACKGROUND OF THE INVENTION

This invention relates to a method of providing a fluid seal of the face-to-face surface type in a downhole drilling apparatus. One or more such seals may be used in connection with such an apparatus which necessarily requires a high degree of reliability and carefree operation in adverse operating conditions which makes remote the possibility of ready inspection and maintenance.

The fluid seal of the type provided with the apparatus and method herein described may be included as a part of a bearing assembly which is filled with lubricating fluid maintained at a higher pressure than the pressure externally acting upon the bearing assembly, thereby assuring that the lubricating fluid is not contaminated and that the entry of external fliuds and other foreign substances, such as drilling mud, is excluded.

SUMMARY OF THE INVENTION

The present invention concerns a method of providing a fluid seal suited for use in downhole drilling apparatuses which is effective to prevent the drilling fluid from contaminating lubricating fluid in a bearing assembly provided between a rotating drive shaft apparatus in a relatively fixed tubular housing in a downhole drilling environment. In the disclosed use of the invention, a rotatable drive shaft extends downwardly into the hole through an elongate tubular housing. The stationary elements of the seal provided by this method are attached to an interior sidewall of the fixed housing and the rotatable elements are attached to the drive shaft.

The rotatable elements include a thrust bearing washer, a retainer ring attached at one end thereof to the washer, a rotating seal having a sealing surface formed on one end thereof, and a plurality of biasing means such as coil springs positioned between the other ends of the retainer ring and the rotating seal. The thrust bearing washer is urged in face-to-face contact with a surface formed on a thrust bearing seat attached to the housing and the springs urge the rotating sealing surface into face-to-face contact with a sealing surface formed on a stationary face attached to the housing. Most desirably, the sealing surfaces are formed of metal, but conceivably could be provided with a non-metallic, low friction surface having suitable wear properties so that the seal is made in each instance by a face-to-face contact.

DESCRIPTION OF THE PREFERRED EMBODIMENTS

Figure 1:
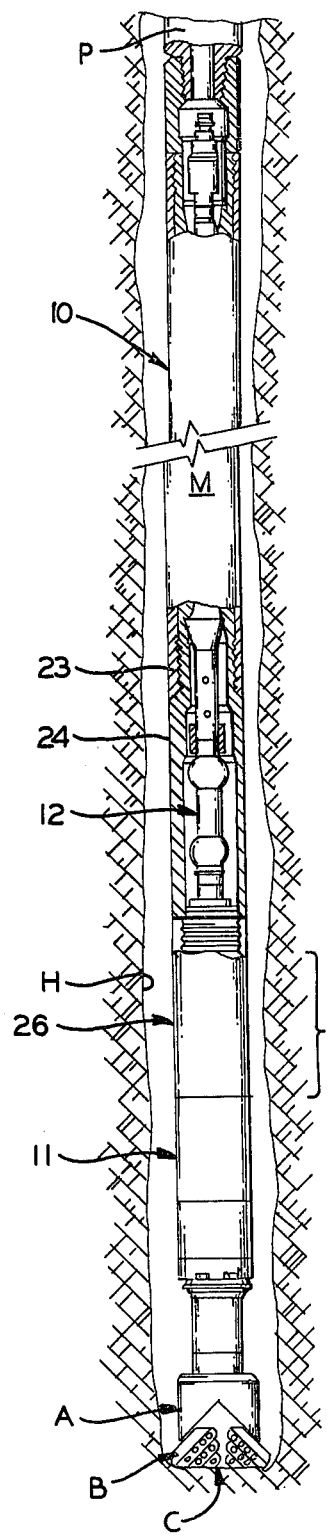
FIG. 1 is a side elevational view of a hydraulic downhole drilling motor secured to a string of drill pipe above it and drill bit below it in a bore hole.

Referring first to FIG. 1, a downhole drilling motor M is shown, the upper portion of which is connected to a tubular string P, such as a string of drill pipe extending to the top of the bore hole H, such as in an oil or gas well being drilled, and a lower end of which is secured to a suitable rotary drill bit A having cutters B for operating on the bottom C of the bore hole H. The drilling motor M includes an upper hydraulic motor portion 10 and a lower drive shaft portion 11 connected to the rotary drill bit A, a universal joint assembly 12 being disposed between the upper and lower portions 10 and 11. The details of the motor M and universal joint assembly 12 do not form a portion of this invention and are not further described.

A lower end of the housing of motor M has a lower threaded box 23 secured to an intermediate housing portion 24 circumjacent the universal joint 12, the lower box end of which is secured in like manner to a lower housing portion or section 26. The lower portion 26 is circumjacent the seal assembly of this invention which is shown in more detail in FIG. 2. These elements in the drill string support and journal for rotation the drive shaft 11, its motor M, the universal joint 12, etc. and transmit the drilling weight from the string of drill pipe P through the housing structure to the drill bit A, to force the cutters B against the bottom C of the bore hole as shown in FIG. 1.

Figure 2:
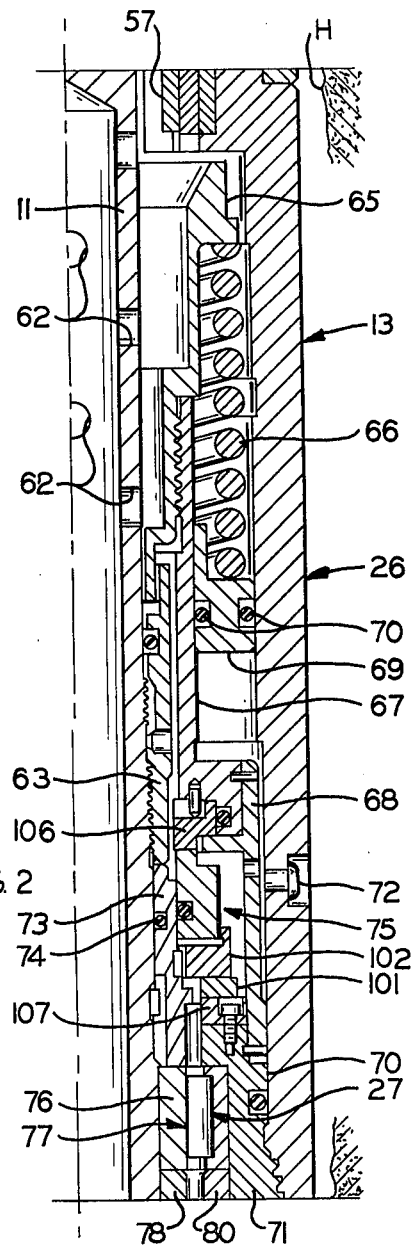
FIG. 2 is an enlarged quarter sectional view in side elevation of a portion of the apparatus shown in FIG. 1, illustrating the details of the seal mechanism provided by the method of this invention; and, FIG. 3 is an enlarged fragmentary quarter sectional view of the portions of the seal assembly shown in FIG. 2.

Referring to FIG. 2, the drive shaft 11 is shown in quarter section within the lower portion 26 of the housing with its upper end journalled in a marine bearing 57, only a portion of which is shown, and its lower end within a bearing assembly 27. The drive shaft 11 has a plurality of ports 62 formed in the sidewall thereof and has an external thread below these ports for receiving a tubular drive shaft nut 63. Circumjacent the drive shaft 11 is a tubular spring retainer 65 with its upper end proximate the lower end of the marine bearing 57. An external flange is formed on the upper end of the retainer 65 which has a lower face which abuts the upper end of a helical spring 66. A sleeve 67 has internal threads formed on the upper end thereof for engaging the threads formed on the exterior of the sidewall of the retainer 65. The sleeve 67 has an increased diameter lower end which rests upon an internal radially extending flange formed on an upper stationary seal retainer 68. The housing section 26, the retainer 65, the sleeve 67 and the retainer 68 form a cavity or annular chamber for retaining the spring 66. A ring type piston 69 is disposed in the lower portion of the annular chamber for sliding movement therein and the upper surface of the piston abuts the lower end of the spring 66. The piston 69 also has an internal and external radial groove formed therein for retaining O-rings 70 which sealingly engage the exterior sidewall of the sleeve 67 and the interior sidewall of the housing 26.

The lower end of the seal retainer 68 is supported by the upper end of the bearing housing 70 which theadingly engages the lower end of the housing 26. During assembly, the cavity below the piston 69 is filled with lubricant, typically oil, through an opening in the sidewall of the housing 26 which opening is then closed with a check valve. The lubricant can be drained through another opening in the housing 26 which normally is closed by a plug 72. The lubricant is inserted under pressure and tends to force the piston 69 upwardly, compressing the spring 66. During normal operation, the spring 66 will maintain the lubricant under a pressure which exceeds the fluid pressure externally, thereby preventing fluid from entering the bearing as will be discussed below. The location of the piston 69 in the cavity is a good indicator of the amount of oil in the bearing section, the location of which is determined by taking a pressure reading of the lubricant. Furthermore, the piston does not come into contact with the rotating parts so that a better seal is effected than in known prior art devices.

The lower end of the drive shaft nut 63 abuts the upper end of a tubular upper guide sleeve 73 which has an internal radial groove formed therein for retaining an O-ring 74 which sealingly engages the exterior sidewall of the drive shaft 11. A seal subassembly 75 which is further illustrated in FIG. 3, has an upper end attached to the lower end of the sleeve 67 and a lower end attached to the upper end of a housing 71. A central portion of the sub-assembly 75 is keyed to the upper guide sleeve 73 for rotatin therewith. The seal sub-assembly will be discussed in more detail below.

Figure 3:
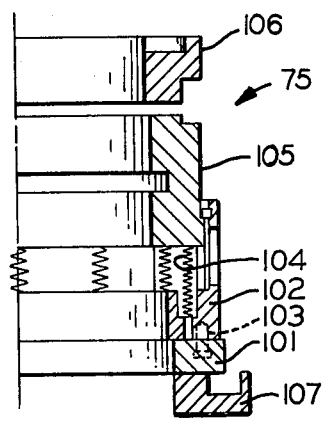

The lower end of the sleeve 73 abuts the upper surface of an inner race 76 of a cylindrical roller bearing 77. The race 76 is supported by a spacer sleeve 78 which in turn is supported by a thrust bearing thrust ring (not shown) which is a part of a thrust bearing in the lower portion of the device. The bearing 77 is supported by a spacer sleeve 80 which in turn is supported by a portion of the lower thrust bearing (not shown). The drilling mud or other external contaminated fluid is prevented from entering the bearing assembly and the lubricant by the seal sub-assembly 75 which is described in detail in FIG. 3. FIG. 3 shows an enlarged quarter section of the seal sub-assembly which includes a thrust bearing washer 101 attached to a retainer ring 102 by a suitable threaded fastener 103. The ring 102 has a plurality of apertures in the upper face thereof for receiving the lower end of helical springs 104. The upper ends of the springs 104 abut the lower surface of an upper rotating seal 105. The retainer 102 is keyed to the upper guide sleeve 72 (See FIG. 2) for rotation with the drive shaft 11. The above identified rotating seal 105 abuts a stationary seal 106 which is pinned to the piston sleeve 67, as also shown in FIG. 2.

The seals 105 and 106 are made preferably from metal and are maintained in face-to-face contact by the springs 104 to provide sealing at a very low pressure. The washer 101 rotates against a thrust bearing seat 107 such that the retainer 102 is supported by the housing 13 rather than the drive shaft 11. This type of seal accommodates radial runout better than an elastomeric type seal and is well balanced against high pressure and reverse pressure. The seal will accommodate axial oscillations and is relatively maintenance free and reliable, which is highly desirable for installations of the type described in a downhole drilling operation.

In normal use, the drill bit A is secured to the lower end of the drive shaft 11 and the motor portion 10 is secured to the lower end of the string of drill pipe P. As the drilling apparatus is lowered through the drilling fluid and the bore hole H to the bottom C thereof, a by-pass and relief valve (not shown) is opened to permit fluid to flow upwardly through jets or nozzles (not shown) in the drill bit A. The fluid flows into a central passage in the bit, through a central passage in the drive shaft, out the ports 62 into the annular space above the bearings, through the marine bearing 57 and the channels in the drive shaft extension (not shown), and into the space between the housing 24 and the universal joint assembly 12. The fluid then enters side ports of a central passage in a rotor of the motor 10 and continues up an internal passage of the hollow rotor, through the open by-pass and relief valve and into the drill pipe P.

When the bit A reaches the bottom C of the bore hole H, drilling mud or other fluid is pumped down through the drill pipe P. At a predetermned pressure, the by-pass and relief valve closes directing the fluid to flow between the rotor and a stator of the motor 10 such that that the rotor rotates. The fluid follows the above-described path in the opposite direction to discharge from the bit A cleaning the cutters and flushing the cuttings in a lateral outward direction and upwardly through the annular space between the drilling apparatus and the bore hole.

In summary, the present invention provides a method of providing a fluid seal for a downhole drilling operation which has a pair of fixed, axially spaced apart metallic surfaces with a rotating sealing element having a pair of parallel surfaces formed thereon. The rotating element includes a mechanism for urging one of the pair of parallel surfaces upwardly into face-to-face contact with one of the fixed surfaces and the weight of the mechanism urges the lower surfaces in face-to-face contact together, to thus provide a metal-to-metal seal which separates the lubricant reservoir from external contamination as described above.

Although the invention is described in terms of a specific embodiment as set forth in the figures, it should be understood that this is by illustration only and that the invention is not necessarily limited thereto. Since alternative embodiments in operating techniques will become apparent to those skilled in the art in view of the disclosure. Accordingly, modifications are contemplated which can be made without departing from the spirit of the described invention.

What is claimed and desired to be secured by Letters Patent is:

1. A method of well drilling incorporating pressured mud comprising the steps of:
(1) connecting a drive shaft between a mud-driven motor and a drill bit;

(2) surrounding a portion of said drive shaft with a tubular housing defining an annular chamber containing a pair of axially spaced face seal housing bearings respectively cooperating with bearing surfaces on said shaft portion to absorb thrust forces on said drive shaft;

(3) positioning a spring backed annular piston in one axial end of said annular chamber to permit expansion of the volume of said annular chamber;

(4) displacing said annular piston and compressing said spring in said housing by filling said chamber with pressurized lubricating oil at the surface to maintain a fluid pressure on the oil in said chamber by said spring pressed piston at all times in excess of the mud pressure to prevent mud flow through said bearing surfaces;

(5) providing a mud passage through said drive shaft to circumvent the oil filled chamber portions of said housing; and (6) connecting the housing to a hollow work string by which the assemblage is inserted in the well and supplied with pressured mud.

2. The method of claim 1 further comprising the step of resiliently maintaining said housing face seal bearings in engagement with said bearing surfaces on said shaft portion.

* * * * *